US011474808B2

(12) United States Patent
Miura

(10) Patent No.: US 11,474,808 B2
(45) Date of Patent: Oct. 18, 2022

(54) VEHICULAR SOFTWARE UPDATE APPARATUS

(71) Applicant: Huawei Technologies Co., Ltd., Shenzhen (CN)

(72) Inventor: Masashi Miura, Kariya (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/228,259

(22) Filed: Apr. 12, 2021

(65) Prior Publication Data

US 2021/0232382 A1 Jul. 29, 2021

Related U.S. Application Data

(63) Continuation of application No. 16/544,945, filed on Aug. 20, 2019, now Pat. No. 10,990,379.

(30) Foreign Application Priority Data

Aug. 22, 2018 (JP) .................................. 2018-155779

(51) Int. Cl.
| | |
|---|---|
| *G06F 8/65* | (2018.01) |
| *H04L 67/12* | (2022.01) |
| *H04L 67/00* | (2022.01) |
| *B60R 16/023* | (2006.01) |

(52) U.S. Cl.
CPC .............. *G06F 8/65* (2013.01); *B60R 16/023* (2013.01); *H04L 67/12* (2013.01); *H04L 67/34* (2013.01)

(58) Field of Classification Search
CPC ........................................................ G06F 8/65
See application file for complete search history.

(56) References Cited

U.S. PATENT DOCUMENTS

| | | |
|---|---|---|
| 9,323,314 B1 | 4/2016 | Jia et al. |
| 2002/0002045 A1 | 1/2002 | Aoki et al. |
| 2006/0046774 A1 | 3/2006 | Fukuda |
| 2013/0147605 A1 | 6/2013 | Chang et al. |
| 2013/0229681 A1 | 9/2013 | Murata et al. |

(Continued)

FOREIGN PATENT DOCUMENTS

| | | |
|---|---|---|
| JP | 2002261685 A | 9/2002 |
| JP | 3760079 B2 | 3/2006 |

(Continued)

OTHER PUBLICATIONS

U.S. Appl. No. 16/544,945, filed Aug. 20, 2019.

*Primary Examiner* — Jae U Jeon
(74) *Attorney, Agent, or Firm* — Leydig, Voit & Mayer, Ltd.

(57) ABSTRACT

A vehicular software update apparatus is used to a vehicle to update software stored in an electronic control unit mounted on the vehicle. The vehicular software update apparatus includes a low power communication device configured to perform a wide area wireless communication with a low power consumption. The low power communication device is operated in an update confirmation state including a state where neither power generation in the vehicle nor power supplying to the vehicle is performed, and is caused to download software update information which is information necessary to update the software, when the software update information, is provided by the server.

12 Claims, 9 Drawing Sheets

(56) References Cited

U.S. PATENT DOCUMENTS

| | | | |
|---|---|---|---|
| 2015/0025704 A1* | 1/2015 | Horihata | H04L 12/40039 |
| | | | 700/297 |
| 2015/0177362 A1* | 6/2015 | Gutierrez | B60R 25/245 |
| | | | 701/519 |
| 2015/0347117 A1* | 12/2015 | Tokunaga | H04L 67/02 |
| | | | 717/173 |
| 2018/0018160 A1 | 1/2018 | Teraoka et al. | |
| 2018/0024828 A1 | 1/2018 | Nogueira-Nine | |
| 2018/0150289 A1 | 5/2018 | Adrangi et al. | |

FOREIGN PATENT DOCUMENTS

| | | | |
|---|---|---|---|
| JP | 2016218932 A | 12/2016 | |
| JP | 2017027549 A | 2/2017 | |
| JP | 2017073689 A | 4/2017 | |
| JP | 6216730 B2 | 10/2017 | |

* cited by examiner

VEHICULAR SOFTWARE UPDATE APPARATUS

CROSS REFERENCE RELATED APPLICATION

This application is a continuation of U.S. patent application Ser. No. 16/544,945, filed on Aug. 20, 2019, which claims priority to Japanese Patent Application No. JP2018-155779, filed on Aug. 22, 2018. All of the afore-mentioned patent applications are hereby incorporated by reference in their entireties.

TECHNICAL FIELD

The present disclosure relates to a vehicular software update apparatus, and more particularly to a technology for reducing the restriction on updating software.

BACKGROUND

In order to control an engine, a transmission, an air conditioner, etc., many ECUs (Electronic Control Units) are mounted in a motor vehicle. In recent years, there has been a demand for implementation of a function of constantly updating firmware stored in an ECU to the latest version by wireless communication. This function is called FOTA (Firmware On-The-Air). Such ECU firmware has become increasingly complex and large in data volume in recent years.

SUMMARY

According to an example of the present disclosure, a vehicular software update apparatus is used to a vehicle to update software stored in an electronic control unit mounted on the vehicle. The vehicular software update apparatus includes a low power communication device configured to perform a wide area wireless communication with a low power consumption. The low power communication device is operated in an update confirmation state including a state where neither power generation in the vehicle nor power supplying to the vehicle is performed, and is caused to download software update information which is information necessary to update the software, when the software update information is provided by the server.

BRIEF DESCRIPTION OF DRAWINGS

The objects, features and advantages of the present disclosure will become more apparent from the following detailed description made with reference to the accompanying drawings. In the drawings.

DETAILED DESCRIPTION

<First Embodiment>

Figure 1:
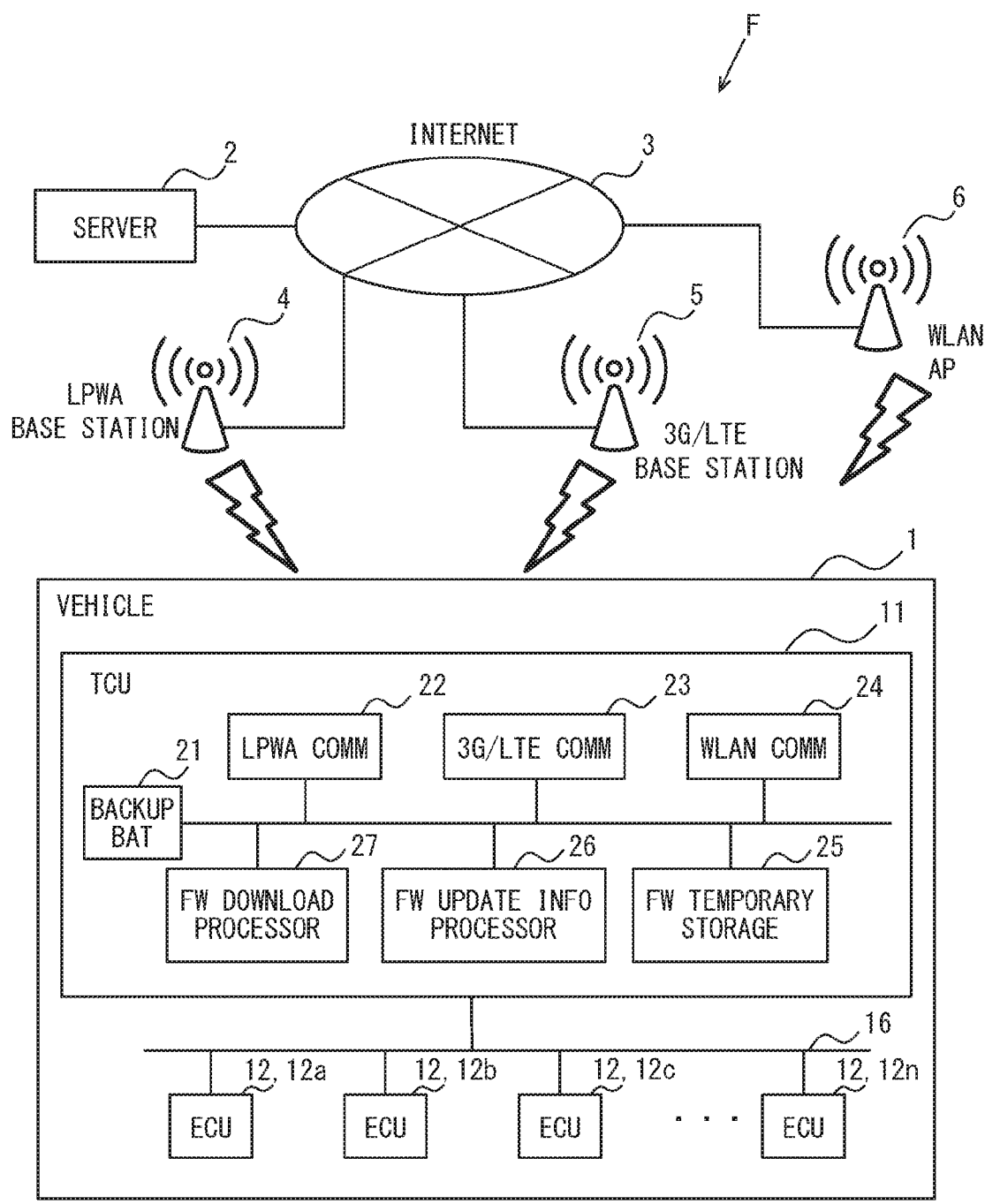
FIG. 1 is a diagram showing a configuration of a firmware update system.

Hereinafter, embodiments will be described with reference to the drawings. FIG. 1 is a system configuration diagram of a firmware updating system F by wireless communication. The firmware updating system F updates firmware, which is an example of software.

[Configuration Overview of Firmware Update System F]

The firmware update system F includes (i) a server 2 and (ii) a TCU (Telematics Control Unit) 11 mounted on a vehicle 1. Although only one vehicle 1 carrying the TCU 11 is shown in FIG. 1, the TCU 11 is mounted on each of a plurality of vehicles 1.

The vehicle 1 is not particularly limited as long as the TCU 11 can be mounted. Therefore, the driving power source of the vehicle 1 is also not particularly limited; the driving power source may be an engine, a motor, or an engine and a motor. However, in the first embodiment and the second embodiment, it is assumed that the vehicle 1 is provided with an engine, the engine can generate power by driving a generator, and the power to the vehicle cannot be supplied from the outside of the vehicle 1.

The server 2 and the TCU 11 can communicate with each other using a public wireless system. The public wireless system includes a public communication network 3, an LPWA base station 4, a 3G/LTE base station 5, and a WLAN access point 6. The LPWA base station 4, the 3G/LTE base station 5, and the WLAN access point 6 are connected to the public communication network 3 by wire or wireless, and communicate with other communication devices connected to the public communication network 3. A single LPWA base station 4, a single 3G/LTE base station 5, and a single WLAN access point 6 are shown in FIG. 1. However, the firmware update system F includes a plurality of LPWA base stations 4, a plurality of 3G/LTE base stations 5, and a plurality of WLAN access points 6.

The server 2 is also connected to the public communication network 3. Also, if the TCU 11 is within the communication range of each of LPWA base station 4, 3G/LTE base station 5 and WLAN access point 6, wireless communication can be performed with the LPWA base station 4, the 3G/LTE base station 5, and the WLAN access point 6, individually. Thus, the server 2 and the TCU 11 can communicate with each other using a public wireless system.

The LPWA base station 4 is a base station that communicates with the communication device by the LPWA communication system, which is low power consumption wide area wireless communication. The LPWA means Low Power Wide Area, and the LPWA communication system is a communication system with low power consumption and a long communication distance. The power consumption of the communication device when communicating by the LPWA communication system is lower than the power consumption when performing data communication with the 3G/LTE base station 5 by the mobile phone. The power consumption of the communication device when communicating by the LPWA communication system is 1 W or less, for example. Further, the communication distance when communicating by the LPWA communication system is 1 km or more, for example, or is 10 km or more in a certain system. The specific communication system classified as LPWA may be LTE-M, NB-IoT, etc. using a band requiring a license, or a system using a band not requiring a license. Examples of systems that use unlicensed bands include SIGFOX®, LoRa®, Wi-FiHaLow, Wi-SUN, RPMA®, and IM 920.

The 3G/LTE base station 5 is a base station that communicates with the communication device by the 3G communication system and the LTE communication system. The 3G communication system is a communication system used in the 3rd generation mobile communication system. LTE (Long Term Evolution) is a communication system used in the 3.9th generation or 4th generation mobile communication system. Both 3G and LTE are communication standards for voice and data communications in mobile phones.

The WLAN access point 6 is an access point of WLAN (Wireless LAN). WLAN is a local area network formed by wireless communication. The communication system used in WLAN may be wireless communication that can form a LAN, and can be, for example, a communication system compliant with the IEEE 802.11 standard.

In the vehicle 1, in addition to the TCU 11, a plurality of various ECUs 12a, 12b, 12c, . . . 12n are mounted. The plurality of ECUs 12a, 12b, 12c, . . . 12n are electronic control units (ECUs) that control electronic control target devices such as an engine, a transmission, and an air conditioner mounted on the vehicle 1. When the plurality of ECUs 12a, 12b, 12c are not described in specific, they are referred to as an ECU 12. In the ECU 12, the firmware determined according to the control target is stored in a storage medium included in the ECU 12. This storage medium is rewritable, and the firmware is updatable.

The ECU 12 and the TCU 11 are communicably connected to each other by the in-vehicle LAN 16. The TCU 11 is a communication device capable of LPWA communication, 3G/LTE communication, and WLAN communication. The TCU 11 has a function as a vehicular software update apparatus for a vehicle, communicates with the server 2 by any of LPWA communication, 3G/LTE communication, and WLAN communication, and downloads a firmware update program from the server 2.

The firmware update program is a program for updating the firmware stored in the ECU 12, and may be the whole firmware of a new version or a program for rewriting a part of the firmware of the old version. The firmware update program is an example of a software update program.

[Configuration of TCU 11]

Next, the configuration of the TCU 11 will be described. The TCU 11 includes a backup battery 21, an LPWA communication unit 22, a 3G/LTE communication unit 23, a WLAN communication unit 24, an FW temporary storage unit 25 (which is also referred to as an FW temporary storage unit for TCU), an FW update information processor unit 26 (which is also referred to as an FW update information processor unit for TCU), and an FW download processor unit 27 (which is also referred to as an FW download processor unit for TCU).

The backup battery 21 is a battery for operating the TCU 11 even when power supply from the main battery provided in the vehicle 1 is not performed. The backup battery 21 is provided separately from the main battery in order to notify the help center or the like of an emergency state in an emergency. Further, in the present embodiment, in addition to the notification at the time of emergency, the backup battery 21 supplies power to the LPWA communication unit 22 included in the TCU 11. The backup battery 21 may be a primary battery or a secondary battery.

The main battery provided in the vehicle 1 supplies power to the TCU 11 when the power supply position of the vehicle 1 is in the on position. On the other hand, when the power supply position of the vehicle 1 is in the accessory position or in the off position, the power is not supplied from the main battery to the TCU 11.

When the power supply position is the accessory position and the off position, the vehicle 1 does not drive the engine. Therefore, when the power supply position is the accessory position and the off position, the power generation by the vehicle 1 is not performed. In such a case, when the TCU 11 is operated by supplying power from the main battery, the voltage of the main battery may decrease, which may make it impossible to start the engine or the like. When the power supply position is in the on position, power generation by the engine is possible. When the voltage of the main battery decreases, the engine drives a generator to generate power, and the generated power charges the main battery.

The power supply position may be switched by an ignition switch. When the power supply position is switched by the ignition switch, the power supply position comes to be in the on position with the ignition on.

Figure 2:
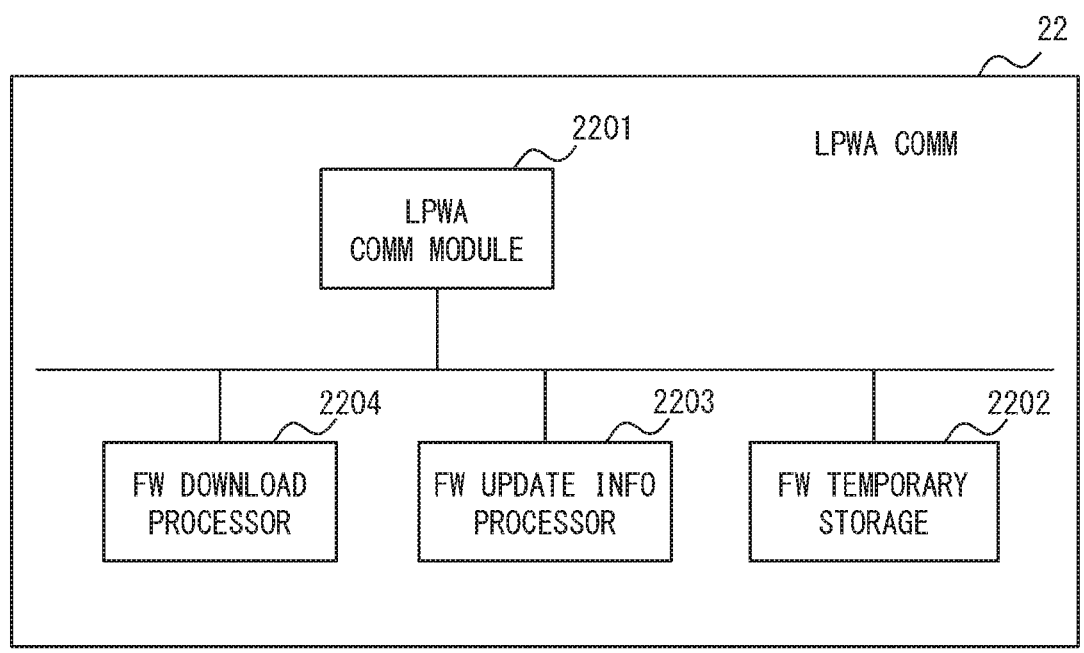
FIG. 2 is a block diagram showing an internal configuration of an LPWA (Low Power Wide Area) communication unit.

The LPWA communication unit 22 is a communication unit that performs wireless communication with the LPWA base station 4 by the LPWA communication system. FIG. 2 is a block diagram showing an internal configuration of the LPWA communication unit 22. As shown in FIG. 2, the LPWA communication unit 22 includes an LPWA communication module 2201, an FW temporary storage unit 2202 (which is also referred to as an FW temporary storage unit for LPWA), an FW update information processor unit 2203 (which is also referred to as an FW update information processor unit for LPWA), and an FW download processor unit 2204 (which is also referred to as an FW download processor unit for LPWA).

The LPWA communication module 2201 is a wireless circuit part that performs signal modulation, demodulation, amplification, and the like when performing wireless communication with the LPWA base station 4 by the LPWA communication system.

The FW temporary storage unit 2202 is a storage unit that temporarily stores the firmware downloaded from the server 2 using the LPWA communication module 2201. For example, a flash memory can be used as this storage unit.

As one of examples, in the present embodiment, the FW update information processor unit 2203 and the FW download processor unit 2204 described next are realized by a computer including a CPU, a ROM, a RAM, an I/O, and a bus line connecting these components. The ROM stores a program for causing a general purpose computer to function as the FW update information processor unit 2203 and the FW download processor unit 2204. The computer functions as the FW update information processor unit 2203 and the FW download processor unit 2204 by the CPU executing the program stored in the ROM while using the temporary storage function of the RAM. When these functions are executed, a method corresponding to the program is executed.

Note that the storage medium for storing the program executed by the CPU is not limited to the ROM, as long as it is stored in a computer readable non-transitory tangible storage medium. For example, the program may be stored in a flash memory. In addition, part or all of the functions of each of the FW update information processor unit 2203 and the FW download processor unit 2204 may be realized using one or more ICs (in other words, as hardware circuits). Further, part or all of the functions of each of the FW update information processor unit 2203 and the FW download processor unit 2204 may be realized by a combination of software execution by the CPU and hardware circuits. That is, an individual one of the FW update information processor unit 2203 and the FW download processor unit 2204 may be configured to include (i) a hardware circuit, or (ii) a central processing unit (CPU) along with memory storing instructions executed by the CPU, or (iii) both the hardware circuit and the CPU along with memory.

The FW update information processor unit 2203, which is an example of an update information processor unit, operates the LPWA communication module 2201 to communicate with the server 2. If the server 2 can transmit FOTA request information, the LPWA communication module 2201 is operated to communicate with the server 2 so that the LPWA communication module 2201 downloads the FOTA request information from the server 2.

Figure 3:
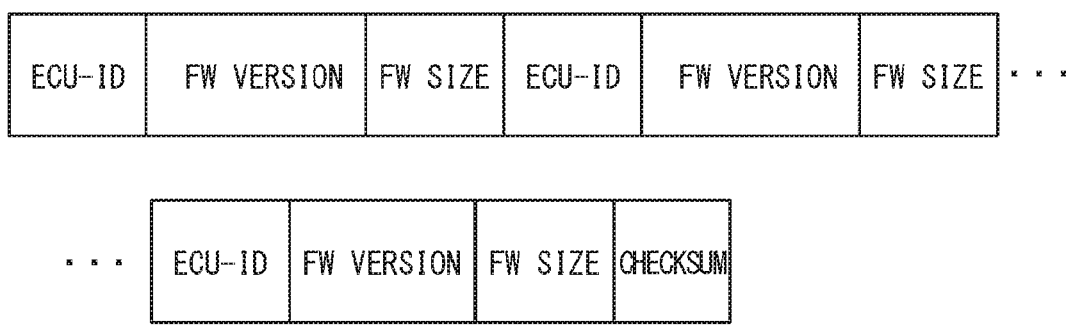
FIG. 3 is a diagram showing a frame format of FOTA request information.

The FOTA request information is information requesting to update the firmware by wireless communication. Further, as shown in FIG. 3, the FOTA request information is information including an ECU-ID, a firmware version, a firmware size, and a checksum. In FIG. 3, the firmware version is described as FW VERSION, the firmware size is described as FW SIZE, and the checksum is described as CHECKSUM.

The ECU-ID is an ID for identifying the ECU 12 that updates the firmware. The firmware version is the version of the newly provided firmware. The firmware size is the data size of the firmware update program that requests download.

Based on the ECU-ID and the firmware version included in the FOTA request information, the TCU 11 checks the version of the firmware stored in the ECU 12 specified by the ECU-ID, and determines the firmware update necessity. Also, based on the firmware size included in the FOTA request information, the TCU 11 can determine the method of downloading the firmware update program. In other words, the FOTA request information is information indicating the contents necessary to update the firmware. The FOTA request information is an example of software update information.

The FW download processor unit 2204, which is an example of the software download processor unit, executes processing related to downloading of firmware, which is determined based on the FOTA request information. Specifically, this processing includes the processing of determining whether or not to download the firmware, determining the communication unit to be used for downloading the firmware, and downloading the firmware using the determined communication unit. Also, the processing may include the processing of determining when to start downloading the firmware. The contents of the processing executed by the FW download processor unit 2204 will be described in detail using the flowcharts of FIG. 4 and subsequent drawings.

Return to the description of FIG. 1. The 3G/LTE communication unit 23 is a communication unit that communicates with the 3G/LTE base station 5 in the 3G communication system and the LTE communication system. If communication is possible with only one of the 3G communication system and the LTE communication system due to a radio wave environment or the like, communication is performed using the communication system on the communicable side. If both the 3G communication system and the LTE communication system can be used for communication, communication is performed using a predetermined communication system (for example, the LTE communication system).

The 3G communication system and the LTE communication system performed by the TCU 11 are the same as the communication system for data communication by the mobile phone. The LPWA communication system performed by the LPWA communication unit 22 is a communication system that consumes less power than the 3G communication system and the LTE communication system. In addition, the LPWA communication system is a communication system with low power consumption as compared with the communication system used in the WLAN communication unit 24. Thus, the LPWA communication unit 22 is an example of a low power communication device. In contrast, each of the 3G/LTE communication unit 23 and the WLAN communication unit 24 may be an example of a high power communication device.

On the other hand, although the power consumption of the 3G/LTE communication unit 23 and the WLAN communication unit 24 is higher than that of the LPWA communication unit 22, the communication speed of the 3G/LTE communication unit 23 and the WLAN communication unit 24 at the time of data communication is higher than that of the LPWA communication unit 22. The 3G/LTE communication unit 23 and the WLAN communication unit 24 are examples of high speed communication devices. In contrast, the LPWA communication unit 22 may be an example of a low speed communication device.

The WLAN communication unit 24 communicates with the WLAN access point 6 by, for example, a communication system based on the IEEE 802.11 standard. The FW temporary storage unit 25 is a storage unit that temporarily stores firmware downloaded from the server 2 using the 3G/LTE communication unit 23 or the WLAN communication unit 24. For example, a flash memory can be used as this storage unit.

The FW update information processor unit 26 and the FW download processor unit 27 operate when power is supplied from the main battery. At the start of operation of the FW update information processor unit 26, the FOTA request information may have been acquired by the LPWA communication unit 22. In this case, the FW update information processor unit 26 acquires the FOTA request information from the FW update information processor unit 2203 included in the LPWA communication unit 22. Further, when the power supply from the main battery is ended while downloading the firmware update program, the FW update information processor unit 26 copies the FOTA request information and the firmware update program in the middle of the download, to the LPWA communication unit 22. Note that the FW update information processor unit 26 and the FW update information processor unit 2203 may be provided to be integrated with each other as a single FW update information processor unit 26, 2203.

The processing executed by the FW download processor unit 27 is the same as the FW download processor unit 2204 except that the communication unit used for communication with the server 2 is different. Therefore, the FW download processor unit 27 is also an example of a software download processor unit. Note that the FW download processor unit 27 and the FW download processor unit 2204 may be provided to be integrated with each other as a single FW download processor unit 27, 2204. Further, an individual one of the FW update information processor unit 26 and the FW download processor unit 27 may be configured to include (i) a hardware circuit, or (ii) a central processing unit (CPU) along with memory storing instructions executed by the CPU, or (iii) both the hardware circuit and the CPU along with memory. As one of examples, in the present embodiment, each of the FW update information processor unit 26 and the FW download processor unit 27 is realized by a computer provided with a CPU, a ROM, a RAM, an I/O, a bus line connecting these components, and the like.

[Processing to Download Firmware]

Next, the processing in which the TCU 11 downloads firmware will be described. In an update confirmation state, the TCU 11 repeatedly communicates with the server 2 by the LPWA communication unit 22 and confirms whether the server 2 has FOTA request information.

The frequency of confirming whether the server 2 has the FOTA request information is, for example, a fixed cycle, and does not depend on whether power is supplied from the main battery. That is, the update confirmation state includes a state in which power is not supplied from the main battery to the TCU 11. When the power supply position is in the off position, no power is supplied to the TCU 11 from the main battery. At this time, since the engine is stopped, power generation in the vehicle 1 is not performed. In the state where power is not supplied from the main battery, the TCU 11 is supplied with power from the backup battery 21.

The confirmation processing for confirming whether the server 2 has the FOTA request information is executed by either the FW update information processor unit 26 or the FW update information processor unit 2203. That is, in the state where power is supplied from the main battery, the FW update information processor unit 26 executes the confirmation processing; in the state where power is supplied from the backup battery 21, the FW update information processor unit 2203 executes the confirmation processing. However, even when power is supplied from the main battery, the FW update information processor unit 2203 may execute this confirmation processing.

When the power of the backup battery 21 is used, the power of the backup battery 21 is reduced at the time of notification of an emergency state which is one of the purposes for which the backup battery 21 is provided. It is thus concerned that the notification of the emergency state cannot be made. However, since the backup battery 21 is limited to only supplying power to the LPWA communication unit 22 which consumes low power, the power reduction of the backup battery 21 is suppressed.

Further, when power is supplied from the main battery, the above-mentioned confirmation processing can also be performed using the 3G/LTE communication unit 23 or the WLAN communication unit 24. However, in order to avoid the processing becoming complicated, in the present embodiment, the LPWA communication unit 22 is used to confirm whether FOTA request information is present in the server 2, regardless of whether the power is supplied from the main battery or not.

[Download Processing Example 1]

Figure 4:
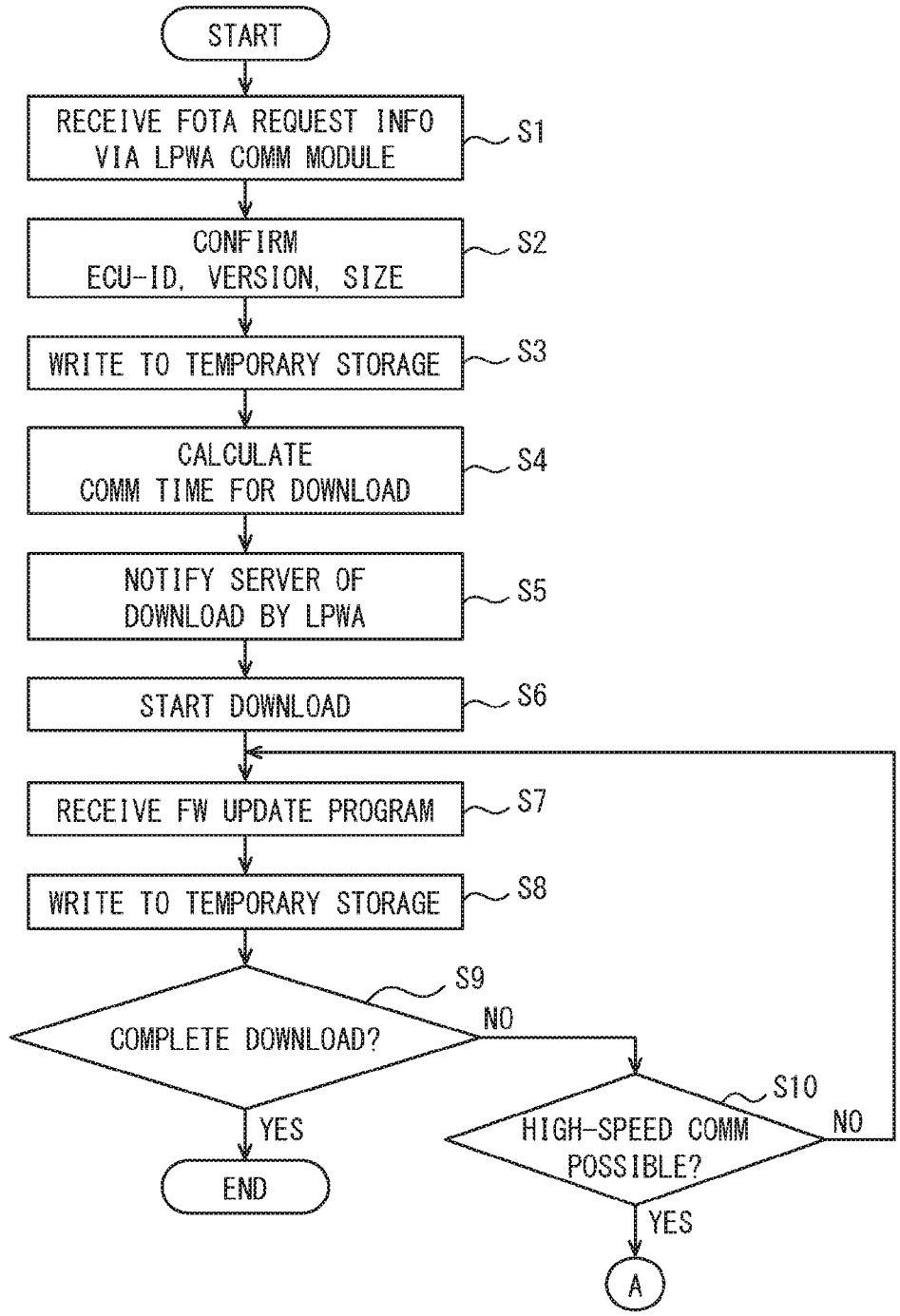
FIG. 4 is a flowchart showing processing executed by an FW (Firm Ware) update information processor unit for LPWA and an FW download processor unit for LPWA.

FIG. 4 shows the processing which is executed by the FW update information processor unit 2203 and the FW download processor unit 2204 in the LPWA communication unit 22 when the server 2 has the FOTA request information under the state where the power is not supplied from the main battery. Among the processing shown in FIG. 4, the FW update information processor unit 2203 executes S1 to S4, and the FW download processor unit 2204 executes S5 to S10.

In S1 in FIG. 4, the LPWA communication module 2201 receives FOTA request information. In S2, the ECU-ID, the firmware version, and the firmware size included in the FOTA request information received in S1 are confirmed. In S3, the FOTA request information received in S1 is written to the FW temporary storage unit 2202.

In S4, the communication time required when downloading the firmware using the LPWA communication unit 22 is calculated. In this calculation, the communication speed when the LPWA communication unit 22 and the LPWA base station 4 communicate with each other is a predetermined constant value.

By comparing the ECU-ID and the firmware version included in the FOTA request information with the ID of the ECU 12 and the firmware version stored in the ECU 12, it is possible to determine a firmware update program that needs to be downloaded. Then, by dividing the size of the firmware update program that needs to be downloaded by the communication speed of the LPWA communication unit 22, the communication time required for the download can be calculated.

In S5, a notification is transmitted from the LPWA communication module 2201 to the server 2; such a notification indicates that the firmware update program is to be downloaded by the LPWA communication unit 22.

In S6, the download of the firmware update program is started using the LPWA communication module 2201; then, in S7, the firmware update program is received. In S8, the firmware update program received in S7 is written to the FW temporary storage unit 2202.

In S9, it is determined whether the download of the firmware update program has been completed. If the determination in S9 is NO, the processing proceeds to S10. In S10, it is determined whether high speed communication has become possible. Specifically, high speed communication is communication using either the 3G/LTE communication unit 23 or the WLAN communication unit 24. In order to energize the 3G/LTE communication unit 23 and the WLAN communication unit 24, the power supply position needs to be in the on position. For example, when the engine is driven, the 3G/LTE communication unit 23 and the WLAN communication unit 24 are energized. Then, if the 3G/LTE communication unit 23 can communicate with the 3G/LTE base station 5, it is determined that high speed communication is possible. Further, it is determined that the WLAN communication unit 24 can communicate with the WLAN access point 6.

If the determination in S10 is NO, the processing returns to S7 and the download of the firmware update program is continued. If the determination in S9 is YES while the processing in S7 to S10 are repeated, the processing in FIG. 4 is ended. In this case, the firmware update program stored in the FW temporary storage unit 2202 in the LPWA communication unit 22 is written to the ECU 12 by executing the processing shown in FIG. 5 described below. In addition, if the determination in S10 is YES while the process from S7 to S10 is repeated, the processing proceeds to FIG. 6.

Figure 5:
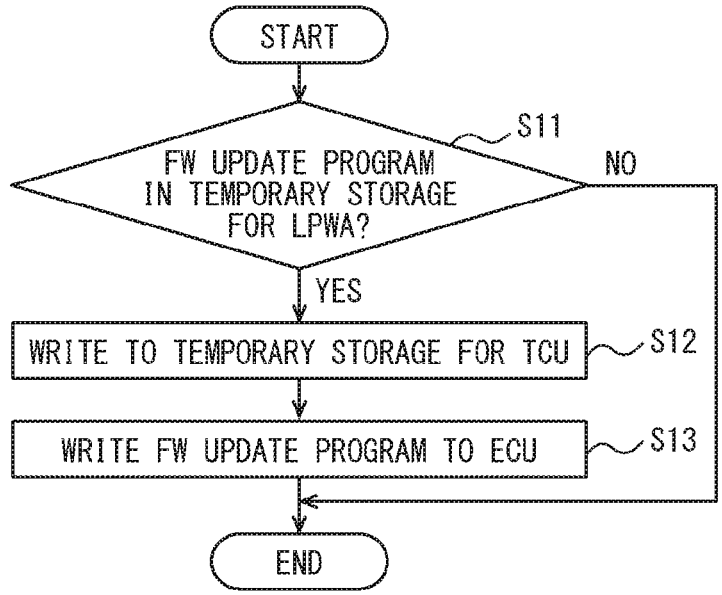
FIG. 5 is a flowchart showing processing executed by an FW download processor unit for TCU (not for LPWA)

First, FIG. 5 will be described. FIG. 5 is processing executed by the FW download processor unit 27. The FW download processor unit 27, which is an element other than the LPWA communication unit 22 in the TCU 11, is activated when the power supply position of the vehicle 1 becomes the on position, and executes the processing in FIG. 5.

In S11, it is determined whether the firmware update program is stored in the FW temporary storage unit 2202. If this determination is NO, the processing in FIG. 5 is ended. On the other hand, if the determination at S11 is YES, the processing proceeds to S12. In S12, the firmware update program stored in the FW temporary storage unit 2202 included in the LPWA communication unit 22 is written in the FW temporary storage unit 25. After that, the firmware update program is erased from the FW temporary storage unit 2202. At S13, the firmware update program is written to the ECU 12 determined by the ECU-ID.

Figure 6:
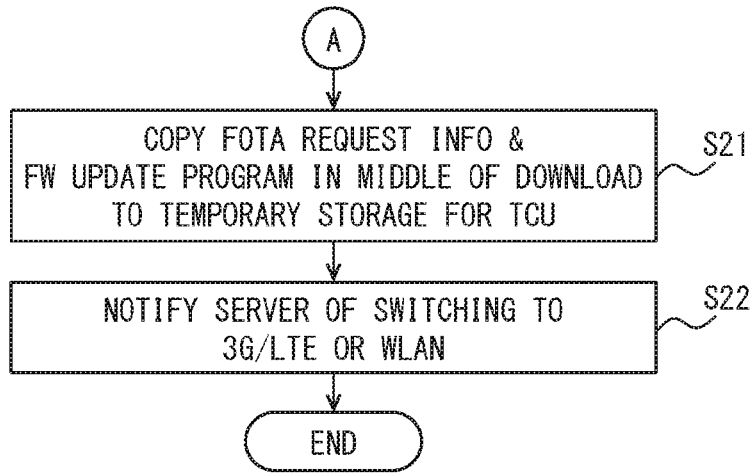
FIG. 6 is a flowchart showing processing executed by an FW download processor unit for LPWA.

Next, FIG. 6 executed when the determination in S10 in FIG. 4 is YES will be described. The processing shown in FIG. 6 is executed by the FW update information processor unit 2203. In FIG. 6, in S21, the FOTA request information stored in the FW temporary storage unit 2202 in S3 is written in the FW temporary storage unit 25. In addition, the firmware update program in the middle of downloading written in S8 is also written to the FW temporary storage unit 25.

In subsequent S22, the server 2 is notified that the communication unit for downloading the firmware update program is to be switched to the 3G/LTE communication unit 23 or the WLAN communication unit 24. When both the 3G/LTE communication unit 23 and the WLAN communication unit 24 can communicate, the server 2 is notified of switching to a predetermined side (for example, the WLAN communication unit 24).

Figure 7:
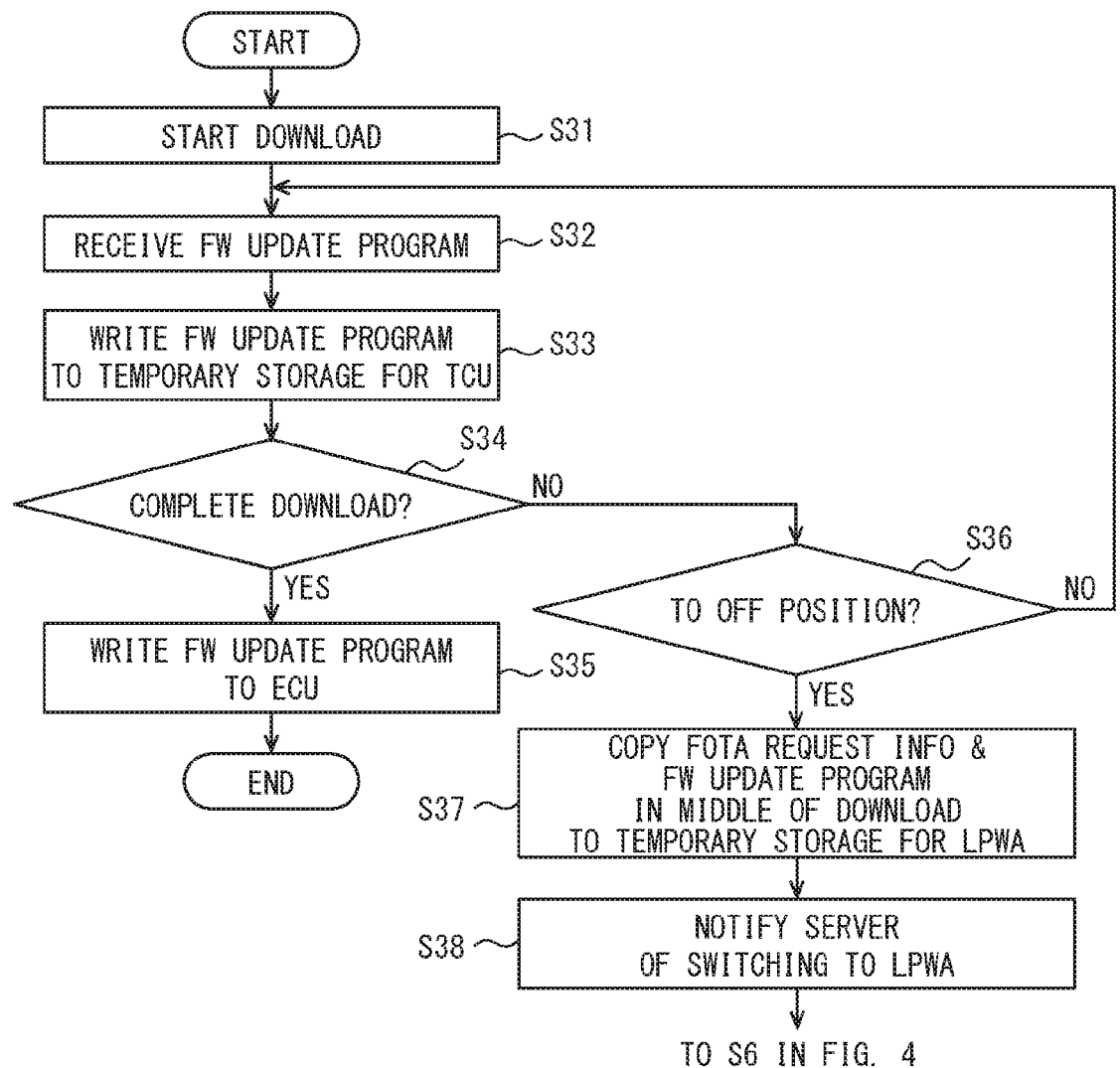
FIG. 7 is a flowchart showing processing executed by an FW update information processor unit for TCU (not for LPWA) and an FW download processor unit for TCU (not for LPWA)

FIG. 7 shows processing executed by the FW update information processor unit 26 and the FW download processor unit 27 when the FW update information processor unit 2203 executes the processing shown in FIG. 6. In FIG. 7, the FW download processor unit 27 executes S31 to S36, and the FW update information processor unit 26 executes S37 and S38.

In S31, the download of the firmware update program is started using the 3G/LTE communication unit 23 or the WLAN communication unit 24. The firmware update program to be downloaded is the part excluding the part already downloaded by the LPWA communication unit 22.

In S32, the firmware update program is received. In S33, the firmware update program received in S7 is written to the FW temporary storage unit 25.

In S34, it is determined whether the download of the firmware update program has been completed. When the determination in S34 is YES, the process proceeds to S35. In S35, the firmware update program is written to the ECU 12 determined by the ECU-ID.

When the determination in S34 is NO, the processing proceeds to S36. In S36, it is determined whether the power supply position has become the off position. If the determination in S36 is NO, the processing returns to S32, and the download of the firmware update program is continued using the 3G/LTE communication unit 23 or the WLAN communication unit 24.

If the determination in S36 is YES, the processing proceeds to S37. In S37, the FOTA request information stored in the FW temporary storage unit 25 is written to the FW temporary storage unit 2202. In addition, the firmware update program in the middle of downloading, which is repeatedly written in S22, is also written to the FW temporary storage unit 2202.

In S38, the server 2 is notified that the communication unit for downloading the firmware update program should be switched to the LPWA communication unit 22. Thereafter, S6 and subsequent processing in FIG. 4 are executed to continue downloading the part of the firmware update program that has not been downloaded yet.

Suppose a case where communication with the 3G/LTE communication unit 23 or the WLAN communication unit 24 becomes possible again due to resumption of vehicle travel after switching the communication unit for downloading the firmware update program to the LPWA communication unit 22. In such a case, the determination in S10 becomes YES. Therefore, the communication unit that downloads the firmware update program returns to the 3G/LTE communication unit 23 or the WLAN communication unit 24.

[Download Processing Example 2]

Figure 8:
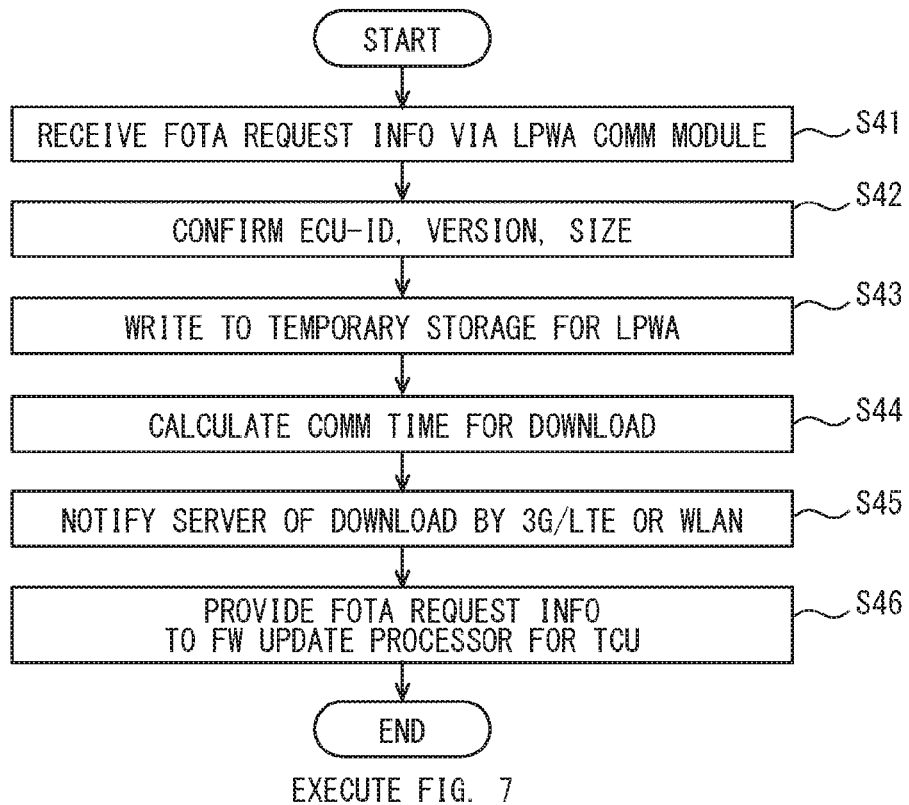
FIG. 8 is a flowchart showing processing different from FIG. 4 which is executed by an FW update information processor unit for LPWA.

FIG. 8 shows download processing different from that of FIG. 4. The condition for executing the processing shown in FIG. 8 is a condition that when the LPWA communication unit 22 executes the processing of confirming FOTA request information, power is supplied from the main battery and the TCU 11 can operate. The processing shown in FIG. 8 is processing to be executed instead of S1 to S5 in FIG. 4; S41 to S44 and S46 are executed by the FW update information processor unit 2203, and S45 is executed by the FW download processor unit 2204.

In FIG. 8, in S41 which is the same as S1 in FIG. 4, the LPWA communication module 2201 receives FOTA request information. In the state where FIG. 8 is executed, power is supplied to the entire TCU 11. The FOTA request information may be thus received using the 3G/LTE communication unit 23 or the WLAN communication unit 24 instead of the LPWA communication module 2201.

In S42, the ECU-ID, the firmware version, and the firmware size included in the FOTA request information received in S41 are confirmed. In S43, the ECU-ID, the firmware version, and the firmware size confirmed in S41 are written in the FW temporary storage unit 2202.

In S44, the communication time required when downloading the firmware using the 3G/LTE communication unit 23 is calculated. In this calculation, the communication speed when the 3G/LTE communication unit 23 and the 3G/LTE base station 5 communicate with each other is assumed to be a predetermined fixed value. This fixed value can be an average value of actual communication speeds. In addition, if the WLAN communication unit 24 can communicate with the WLAN access point 6, the communication time required to download the firmware using the WLAN communication unit 24 may be calculated. The processing in S44 is the same as the processing in S4 except that the value of the communication speed used to calculate the communication time is different from S4.

In S45, a notification is transmitted from the LPWA communication module 2201 to the server 2; the notification indicates that the firmware update program is to be downloaded by the 3G/LTE communication unit 23 or the WLAN communication unit 24. In S46, the FOTA request information received in S41 is provided to the FW update information processor unit 26.

When the processing in FIG. 8 is executed, the firmware update program is downloaded by the 3G/LTE communication unit 23 or the WLAN communication unit 24. Therefore, the FW update information processor unit 26 and the FW download processor unit 27 execute the processing shown in FIG. 7. Note that the "communication unit 22, 23, or 24" may be also referred to as "communicator 22, 23, or 24" or "communication device 22, 23, or 24; the "processor unit 26, 27, 2203, or 2204" may be also referred to as "processor 26, 27, 2203, or 2204". Furthermore, the FW update information processor unit 26, the FW download processor unit 27, the FW update information processor unit 2203, and the FW download processor unit 2204 may be provided to be included in one or more processors (or one or more controllers). An individual one of one or more processors may be configured to include (i) a hardware circuit, or (ii) a central processing unit (CPU) along with memory storing instructions executed by the CPU, or (iii) both the hardware circuit and the CPU along with memory.

[Outline of First Embodiment]

As described above, in the first embodiment, the LPWA communication unit 22 performs communication using a communication system that consumes less power than data communication using the 3G/LTE communication unit 23 or the WLAN communication unit 24. There is a case where the power supply position is the off position and the power generation is thus not performed by the engine. Under such a case, even if the LPWA communication unit 22 is operated, it is possible to suppress a decrease in the remaining battery charge amount.

Therefore, even if the power supply position is the off position, the TCU 11 operates the LPWA communication unit 22 repeatedly to confirm whether the server 2 has the FOTA request information. Then, if the server 2 has FOTA request information, the LPWA communication unit 22 downloads the FOTA request information (S1, S51).

Thus, the TCU 11 can download the FOTA request information even when the power supply position is the off position; the FW download processor units 2204 and 27 can execute the processing related to the download of the firmware update program based on the FOTA request information. This reduces the time limit for updating firmware.

In the first embodiment, after the FOTA request information is downloaded, if the power supply position is the off position or the accessory position, the LPWA communication unit 22 starts downloading the firmware update program (S6). As a result, the download of the firmware update program can be completed earlier than the case where the firmware update program is not downloaded when the power supply position is the off position or the accessory position.

In the first embodiment, suppose a case where while the LPWA communication unit 22 downloads the firmware update program, the power supply position becomes the on position. In such a case, the communication unit to be downloaded is switched to the 3G/LTE communication unit 23 or the WLAN communication unit 24. Thus, the download can be completed earlier than the case where the firmware update program is downloaded using the LPWA communication unit 22 even under the state where the 3G/LTE communication unit 23 or the WLAN communication unit 24 can be used.

<Second Embodiment>

Next, a second embodiment will be described. In the following description of the second embodiment, the elements having the same reference signs as those used up to now are the same as the elements of the same reference signs in the preceding embodiment, unless otherwise mentioned. When only some parts of the configuration are described, the previously described embodiment may be applied to other parts of the configuration.

Figure 9:
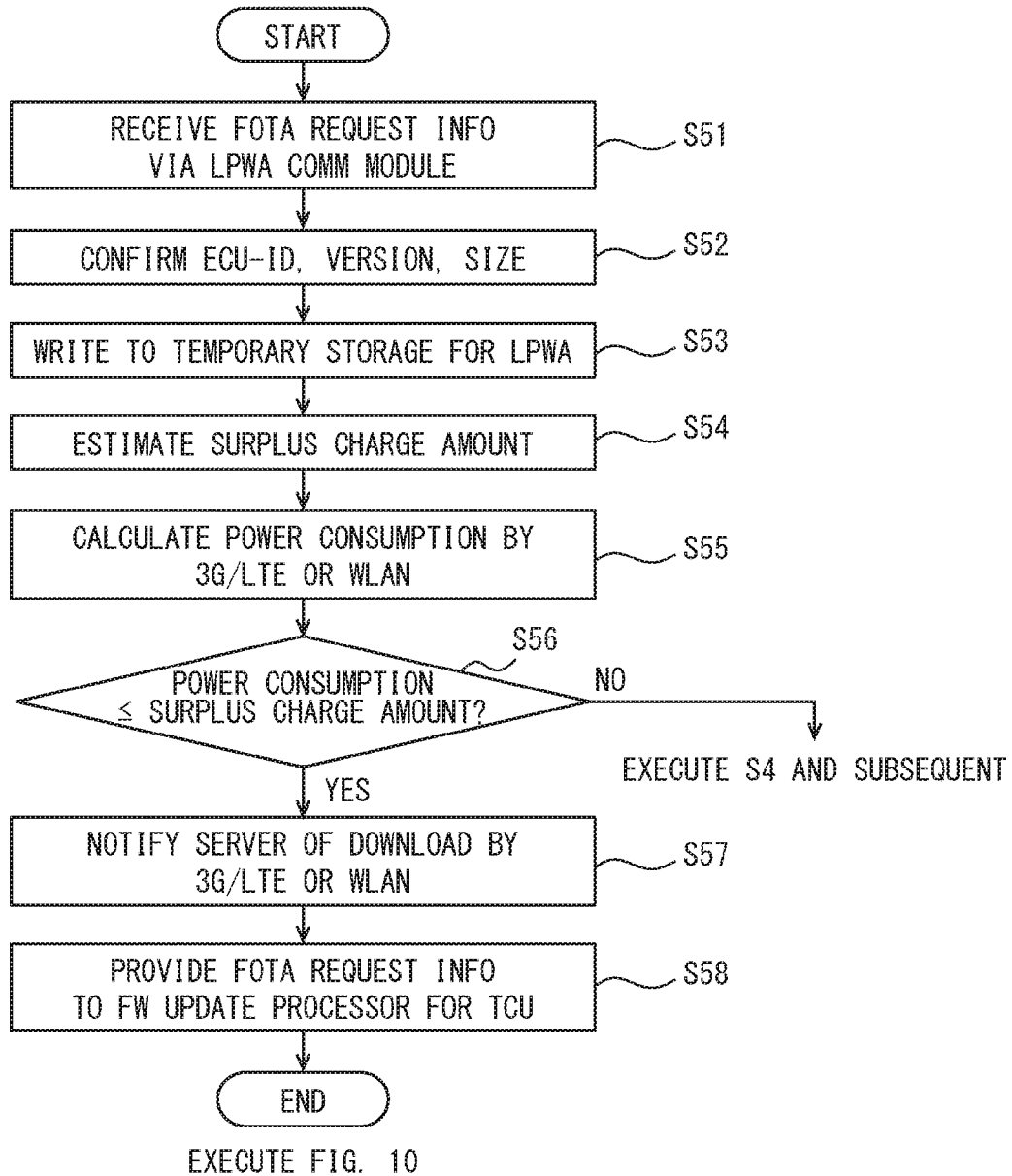
FIG. 9 is a flowchart showing processing executed by an FW update information processor unit for LPWA and an FW download processor unit for LPWA, according to a second embodiment.

FIG. 9 is processing executed in the second embodiment by the FW update information processor unit 2203 and the FW download processor unit 2204 in place of FIG. 4. Therefore, in this state, the power supply position is the accessory position or the off position, and power is not supplied to the TCU 11 from the main battery. Among the processing shown in FIG. 9, the FW update information processor unit 2203 executes S51 to S53 and S58, and the FW download processor unit 2204 executes S54 to S57.

Here, S51 to S53 are the same processing as S1 to S3 in FIG. 4. In following S54, a surplus power amount of the backup battery 21 is estimated. S54, which is an example of a surplus power estimation unit (or module) executed by the FW download processor unit 2204, executes the processing described below to estimate the surplus power amount of the backup battery 21. First, the present remaining battery charge amount of the backup battery 21 is detected. The remaining battery charge amount may be detected by providing a remaining battery charge amount meter IC.

After detection of the current remaining battery charge amount, the surplus power amount can be calculated by subtracting a predetermined minimum remaining battery charge amount required for the backup battery 21 from the remaining battery charge amount. The minimum remaining battery charge amount in the backup battery 21 means the amount of power necessary to make an emergency call.

The following S55 and S56 are an example of the high speed download determination unit (or module) executed by the FW download processor unit 2204. In S55, the power consumption amount in the case of downloading the firmware update program is calculated using the communication unit available on the current position of the vehicle 1 among the 3G/LTE communication unit 23 and the WLAN communication unit 24.

In order to calculate the power consumption amount, first, the communication time required to download the firmware update program is calculated. If both the 3G/LTE communication unit 23 and the WLAN communication unit 24 can be used, a predetermined side (for example, the WLAN communication unit 24) is used. In order to calculate this communication time, the communication speed of the communication unit used for downloading is required. The communication speed is set to a predetermined constant value. After the communication time is calculated, the power consumption of the communication unit used for downloading is calculated based on the communication time and the power consumption amount of the communication unit used for downloading.

In S56, it is determined whether the power consumption amount calculated in S55 is equal to or less than the surplus charge amount calculated in S54. If this determination is NO, S4 and subsequent processing are executed. Therefore, the download of the firmware update program is started using the LPWA communication unit 22.

If the determination in S56 is YES, the processing proceeds to S57. In S57, a notification is transmitted from the LPWA communication module 2201 to the server 2; the notification indicates that the 3G/LTE communication unit 23 or the WLAN communication unit 24 downloads the firmware update program. In S58, the FOTA request information received in S51 is provided to the FW update information processor unit 26.

Figure 10:
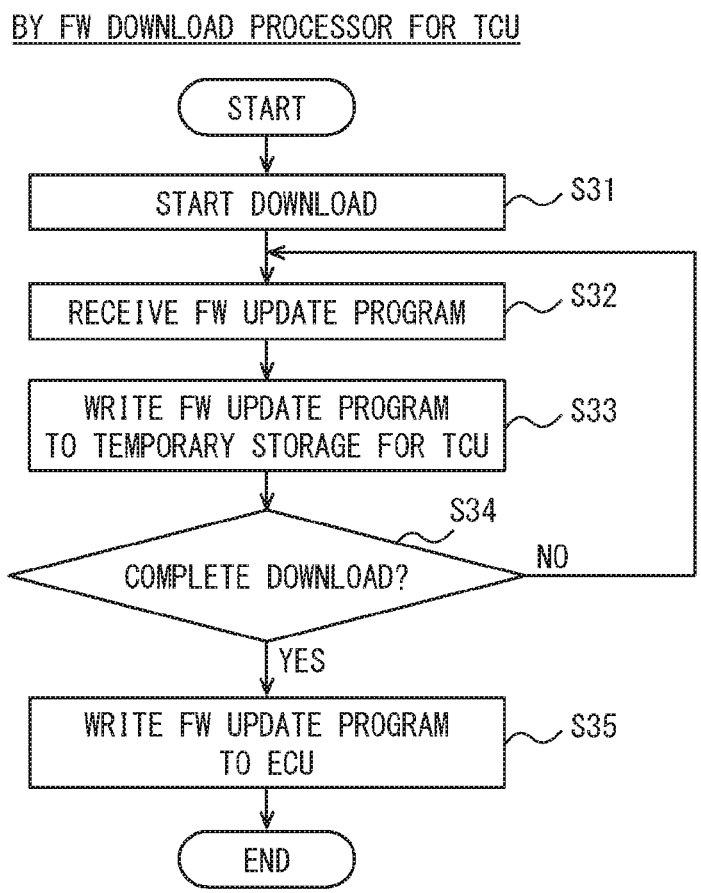
FIG. 10 is a flowchart showing processing executed by an FW download processor unit for TCU (not for LPWA) according to the second embodiment.

Thereafter, the FW download processor unit 27 executes the processing shown in FIG. 10. Since the processing shown in FIG. 10 is the same as a part of the processing shown in FIG. 7, the same reference signs as in FIG. 7 are used. The processing shown in FIG. 10 includes S31 to S35 shown in FIG. 7. In FIG. 7, S36 is executed if the determination in S34 is NO. In contrast, S36 is not provided in FIG. 10, and the processing returns to S32 if the determination in S34 is NO. The FW download processor unit 27 executes the processing shown in FIG. 10 to download the firmware update program by the 3G/LTE communication unit 23 or the WLAN communication unit 24.

[Outline of Second Embodiment]

In the second embodiment, even if the power supply position is the accessory position or the off position, the communication unit that downloads the firmware update program is not immediately determined to be the LPWA communication unit 22. The surplus charge amount of the backup battery 21 serving as a battery for supplying power to the TCU 11 is estimated (S54). In addition, the power consumption amount in the case of downloading the firmware update program by the 3G/LTE communication unit 23 or the WLAN communication unit 24 is calculated (S55).

Then, if the power consumption amount is equal to or less than the surplus charge amount, the firmware update program is downloaded using the 3G/LTE communication unit 23 or the WLAN communication unit 24 even if the power supply position is the accessory position or the off position.

By doing this, it is possible to download the firmware update program at high speed even if the power supply position is the accessory position or the off position while securing the minimum remaining battery charge amount in the backup battery 21.

<Third Embodiment>

Figure 11:
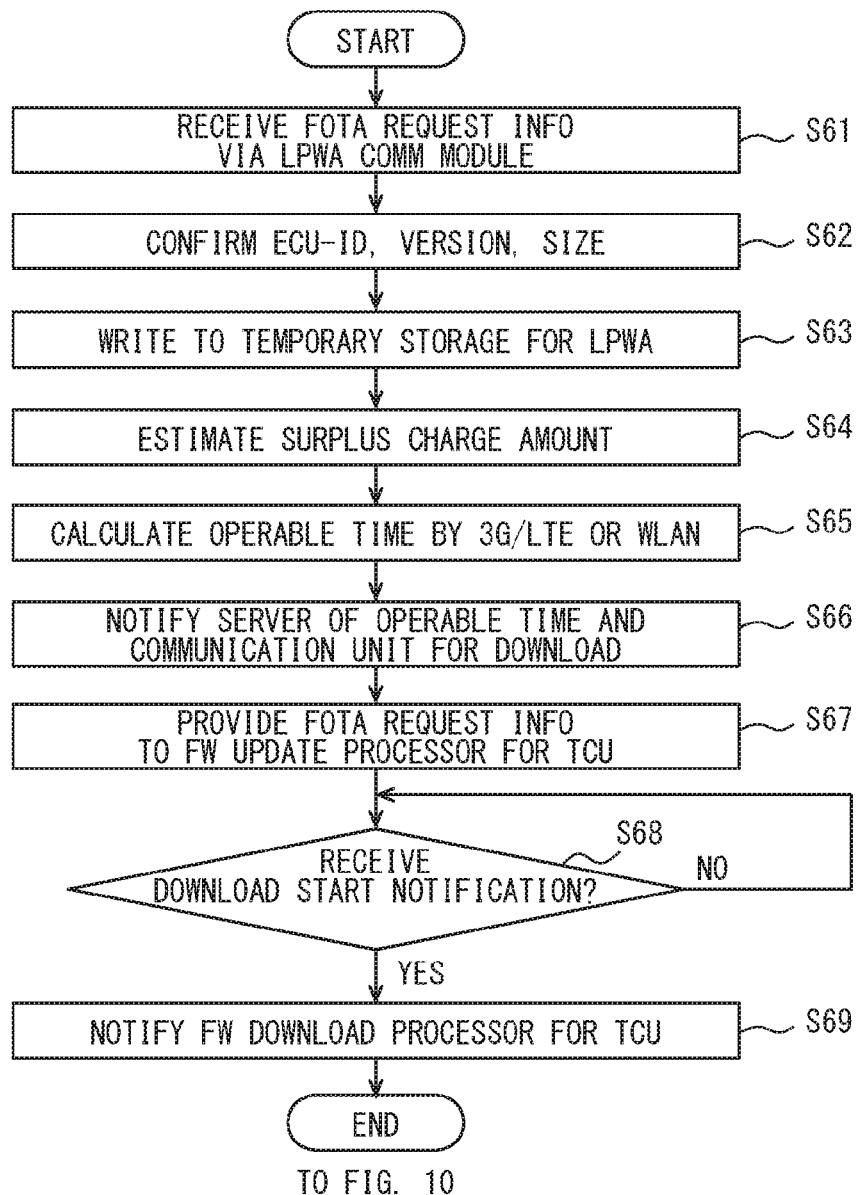
FIG. 11 is a flowchart showing processing executed by an FW update information processor unit for LPWA and an FW download processor unit for LPWA, according to a third embodiment.

FIG. 11 is processing executed in a third embodiment by the FW update information processor unit 2203 and the FW download processor unit 2204 in place of FIG. 4. Therefore, in this state, the power supply position is the accessory position or the off position, and power is not supplied to the TCU 11 from the main battery. Among the processing shown in FIG. 10, the FW update information processor unit 2203 executes S61 to S63 and S67, and the FW download processor unit 2204 executes other processing.

Here, S61 to S63 are the same processing as S1 to S3 in FIG. 4. Subsequent S64, which is an example of a surplus power estimation unit (or module) executed by the FW download processor unit 2204, executes the same processing as S54 in FIG. 9 to estimate the surplus power amount of the backup battery 21.

S65, which is an example of an operable time calculation unit (or module) executed by the FW download processor unit 2204, calculates an operable time for which the 3G/LTE communication unit 23 can be operated with the surplus charge amount calculated in S64. The operable time can be calculated by dividing the surplus charge amount by the power consumption of the 3G/LTE communication unit 23.

In S66, the LPWA communication module 2201 is used to provide the server 2 with a notification indicating (i) the operable time calculated in S65 and (ii) the download of the firmware update program to be executed by the 3G/LTE communication unit 23. In S67, the FOTA request information received in S61 is provided to the FW update information processor unit 26.

When the server 2 receives the notification due to S66 having been executed, the server 2 calculates the communication speed necessary to download the firmware update program in the operable time indicated by the notification.

The 3G and LTE communications are best-effort communications. In this third embodiment, the server 2 also determines resource allocation when the 3G/LTE base station 5 communicates with a communication device. The resource allocation processing may be executed by a control device other than the server 2.

By temporarily allocating a large number of communication resources possessed by the 3G/LTE base station 5 to a certain communication partner, the communication speed with that communication partner can be temporarily increased.

Therefore, when there are few communication devices communicating with the 3G/LTE base station 5, the server 2 allocates, to the 3G/LTE communication unit 23 included in the TCU 11, communication resources capable of achieving the above communication speed. Then, with the allocated communication resources, the server 2 transmits a download start notification instructing to start the download of the firmware update program to the LPWA communication unit 22 in the TCU 11.

In S68 in FIG. 11, it is determined by periodically communicating with the server 2 using the LPWA communication module 2201 whether or not there is a download start notification. When the LPWA communication unit 22 receives the download start notification, the determination in S68 is YES, and the processing proceeds to S69. In S69, the FW download processor unit 27 is notified that the download start notification has been received. The FW download processor unit 2204 ends the processing here.

On the other hand, upon acquiring the download start notification, the FW download processor unit 27 executes the processing shown in FIG. 10. Note that in the third embodiment, the communication unit used is the 3G/LTE communication unit 23. When the FW download processor unit 27 executes the processing shown in FIG. 10, the 3G/LTE communication unit 23 downloads the firmware update program in a short time.

[Outline of Third Embodiment]

In the third embodiment, if the power supply position is the accessory position or the off position, the LPWA communication unit 22 does not download the firmware update program. Instead, the operable time in which the 3G/LTE communication unit 23 can operate is calculated using the surplus charge amount of the backup battery 21 (S65). Then, the LPWA communication module 2201 is used to notify the server 2 of (i) the operable time and (ii) the download of the firmware update program to be executed by the 3G/LTE communication unit 23 (S66).

Then, the side (e.g., the server 2) providing the firmware update program transmits the download start notification at the time when the communication speed sufficient to download the firmware update program can be realized within the operable time.

By doing this, the communication speed by the 3G/LTE communication unit 23 can be increased, so that the firmware update program can be downloaded using the 3G/LTE communication unit 23 even with a small surplus charge amount.

Although the embodiments of the present disclosure have been described above, the present disclosure is not limited to the above embodiments, and various modification examples described below are also included in the technical scope of the present disclosure. Furthermore, various modification examples other than the following can be made without departing from the gist.

First Modification Example

In the embodiments described above, the vehicle 1 is a vehicle that can generate electric power by driving a generator by an engine and cannot receive the supply of the power from the outside of the vehicle 1. However, the vehicle 1 may be a vehicle capable of receiving the supply of power from the outside of the vehicle. As a vehicle that can be supplied with power from the outside of the vehicle, for example, there is an electric vehicle that can be charged by a commercial power source. In the case of a vehicle capable of being supplied with power from the outside of the vehicle, the power supply state may be handled in the same manner as the power supply position in the embodiment described above as the on position.

Second Modification Example

Suppose a case where a travel plan of the vehicle 1 can be predicted. In such a case, the FW download processor unit 27 may be allowed to download the firmware update program using the 3G/LTE communication unit 23 or the WLAN communication unit 24 as follows. Such a case where a travel plan can be predicted corresponds to a case where a guide route to a destination may be set. In addition, the travel plan can be predicted also in a case where a time zone during which the vehicle is parked at a fixed place such as a home can be predicted.

The FW download processor unit 27 executes download of the firmware update program in a case where, in the travel plan, the vehicle 1 is located in a place where the 3G/LTE communication unit 23 or the WLAN communication unit 24 can be available within a time zone during which the power generation in the vehicle 1 or the power supply to the vehicle 1 is able to be performed.

A time zone during which the vehicle 1 is traveling may be regarded as a time zone during which power generation in the vehicle 1 is possible. Suppose a case where within a time zone during which power generation is possible in the vehicle 1, the vehicle 1 is traveling in a place within the communication area of the 3G/LTE base station 5 or the WLAN access point 6. Such a case corresponds to a case where the vehicle 1 is located in a place where the 3G/LTE communication unit 23 or the WLAN communication unit 24 can be available within a time zone during which the power generation is possible in the vehicle 1.

Also, suppose a case where the vehicle 1 is supplied with power within a fixed time zone in a fixed place such as a home. Such a case allows a prediction of a place in which the vehicle 1 is supplied with power and a time zone within which the vehicle 1 is supplied with power. Further, suppose a case where the predicted place is the communication area of 3G/LTE base station 5 or WLAN access point 6. In this case, the vehicle 1 is predicted to be located in a place in which the 3G/LTE communication unit 23 or the WLAN communication unit 24 can be available within a time zone during which power is supplied to the vehicle 1.

Third Modification Example

In the embodiments, the 3G/LTE communication unit 23 and the WLAN communication unit 24 have been described as the high speed communication device. However, the high speed communication device is not limited to the communication unit described in the embodiments. For example, the communication system of the high speed communication device may be a 5G communication system.

Furthermore, in the third embodiment, the communication unit that calculates the operable time is not limited to the 3G/LTE communication unit 23. Another communication system may be employed which can determine the resource allocation on the side providing the firmware update program, and which has a higher communication speed than LPWA communication.

Fourth Modification Example

The communication unit for notifying the server 2 of the operable time and the communication unit to be downloaded in S66 in FIG. 11 may be the 3G/LTE communication unit 23 or the WLAN communication unit 24. The communication unit that makes this notification is a predetermined communication device.

Fifth Modification Example

In the embodiments, when the power supply position is the off position or the accessory position, the TCU 11 operates with the power from the backup battery 21. However, even when the power supply position is the accessory position, the TCU 11 may operate with the main battery.

Further, in the second and third embodiments, a main battery may be used as a battery for operating the 3G/LTE communication unit 23 or the WLAN communication unit 24. In this case, the battery for estimating the surplus charge amount is also the main battery.

Sixth Modification Example

Although the firmware is shown as an example of software in the embodiments, software other than the firmware may be updated.

For reference to further explain features of the present disclosure, the description is added as follows. For instance, in order to control an engine, a transmission, an air conditioner, etc., many ECUs (Electronic Control Units) are mounted in a motor vehicle. In recent years, there has been a demand for implementation of a function of constantly updating firmware stored in an ECU to the latest version by wireless communication. This function is called FOTA (Firmware On-The-Air).

Such ECU firmware has become increasingly complex and large in data volume in recent years. Therefore, FOTA is generally performed using a high speed public wireless line such as 3G/LTE.

However, a communication device using a high speed public wireless line such as 3G/LTE requires some power consumption. Therefore, the execution of FOTA with a communication device using a high speed public wireless line such as 3G/LTE needs a state in which the battery is able to be charged (e.g., the state in which the engine is in a driving state.)

Also, software other than firmware may be updated by wireless communication. Further, even when software other than firmware is updated by wireless communication, a communication device using a high speed public wireless line such as 3G/LTE may be used. This case also requires the state in which the battery is able to be charged, as in the case of updating the firmware.

Therefore, the time for which software can be updated is limited. As a result, there is an issue that the software is not easily updated in a vehicle that has not been used for a long time.

It is thus desired to provide a vehicular software update apparatus that has less restriction in time for software update.

Aspects of the present disclosure described herein are set forth in the following clauses.

According to a first aspect of the present disclosure, a vehicular software update apparatus used to a vehicle to update software stored in an electronic control unit mounted on the vehicle is provided to include a low power communication device, an update information processor, and a software download processor.

The low power communication device is configured to perform a wide area wireless communication with a low power consumption. The update information processor is configured to operate the low power communication device repeatedly in an update confirmation state including a state where neither power generation in the vehicle nor power supplying to the vehicle is performed, and cause the low power communication device to download software update information which is information necessary to update the software, when the software update information is provided by a server. The software download processor is configured to execute processing related to downloading of the software, the processing related to downloading of the software being determined based on the software update information received by the low power communication device.

Under the above aspect, the low power communication device communicates using a communication system that consumes less power than data communication by a mobile phone. Therefore, even if the low power communication device is operated in a state where neither the power generation in the vehicle nor the power supply to the vehicle is performed, it is possible to suppress the decrease in the remaining battery charge amount.

The update information processor unit therefore operates the low power communication device repeatedly even in a state where neither the power generation in the vehicle nor the power supply to the vehicle is performed. Then, when the software update information is provided from the server, the low power communication device is caused to download the software update information.

In this way, the vehicular software update apparatus for vehicles can download software update information even in a state where neither power generation in the vehicle nor power supply to the vehicle is performed. The software download processor unit can thus execute processing related to software download based on the software update information. This reduces the time limit for software update.

According to a second aspect of the present disclosure, a vehicular software update apparatus used to a vehicle to update software stored in an electronic control unit mounted on the vehicle is provided to include a first communication device and one or more processors. The first communication device is configured to perform a wide area wireless communication with a power consumption less than a predetermined threshold value. The one or more processors are configured to operate the first communication device repeatedly in an update confirmation state including a state where neither power generation in the vehicle nor power supplying to the vehicle is performed, cause the first communication device to download software update information which is information necessary to update the software when the software update information is provided by a server, and execute processing related to downloading of the software, the processing related to downloading of the software being determined based on the software update information received by the first communication device.

Furthermore, according to an optional aspect of the vehicular software update apparatus of the second aspect, an individual one of the one or more processors may be configured to include (i) a hardware circuit, or (ii) a central processing unit (CPU) along with memory storing instructions executed by the CPU, or (iii) both the hardware circuit and the CPU along with memory.

What is claimed is:

1. A method, comprising:
   receiving, by a vehicle from a server, software update information in a first state where neither power generation in the vehicle nor power supplying to the vehicle is performed;
   downloading, by the vehicle based on the software update information, a software update program for updating a software stored in an electronic control unit mounted on the vehicle, wherein the downloading is performed by the vehicle in a second state where power generation in the vehicle, or power supply to the vehicle, or both the power generation in the vehicle and the power supply to the vehicle is performed.

2. The method according to claim 1, further comprising:
   determining that a power consumption of a battery mounted on the vehicle, when power is supplied from the battery to download the software update program, is less than a first threshold; and
   downloading the software update program based on the software update information in the first state in response to the determination that the power consumption is less than the first threshold.

3. The method according to claim 2, wherein the first threshold is determined based on a remaining charge amount of the battery and a predetermined minimum remaining charge amount required by the battery.

4. The method according to claim 1, further comprising:
   estimating a remaining charge amount of a battery mounted on the vehicle;
   estimating a surplus power amount that the battery is enabled to output based on the remaining charge amount of the battery and a predetermined minimum remaining charge amount required by the battery;
   calculating an operable time used to download the software update program based on the surplus power amount and a power consumption used to download the software update program;
   notifying the server of the operable time;
   receiving a download start notification notified by the server based on a determination that the software update program is enabled to be downloaded within the operable time; and
   downloading the software update program based on the software update information in the first state in response to reception of the download start notification.

5. An apparatus, comprising:
   at least one processor; and
   a memory coupled to the at least one processor and storing programming instructions for execution by the at least one processor, the programming instructions cause the at least one processor to:
   receive, from a server, software update information used to update software of a vehicle, wherein the vehicle receives the software update information in a first state where neither power generation in the vehicle nor power supplying to the vehicle is performed; and
   download a software update program for updating the software, based on the software update information, in a second state where power generation in the vehicle, or power supply to the vehicle, or both the power generation in the vehicle and the power supply to the vehicle is performed.

6. The apparatus according to claim 5, the programming instructions further cause the at least one processor to:
   determine that a power consumption of a battery mounted on the vehicle when power is supplied from the battery to download the software update program is less than a first threshold; and
   download the software update program based on the software update information in the first state in response to the determination that the power consumption is less than the first threshold.

7. The apparatus according to claim 6, wherein the first threshold is determined based on a remaining charge amount of the battery and a predetermined minimum remaining charge amount required by the battery.

8. The apparatus according to claim 5, the programming instructions further cause the at least one processor to:
- estimate a remaining charge amount of a battery mounted on the vehicle;
- estimate a surplus power amount that the battery is enabled to output based on the remaining charge amount of the battery and a predetermined minimum remaining charge amount required by the battery;
- calculate an operable time used to download the software update program based on the surplus power amount and a power consumption used to download the software update program;
- notify the server of the operable time;
- receive a download start notification notified by the server based on a determination that the software update program is enabled to be downloaded within the operable time; and
- download the software update program based on the software update information in the first state in response to reception of the download start notification.

9. A non-transitory computer-readable storage medium comprising instructions that, when executed by a processor, cause a vehicle to:
- receive, from a server, software update information used to update software of the vehicle, wherein the software update information is received in a first state where neither power generation in the vehicle nor power supplying to the vehicle is performed; and
- download a software update program for updating the software, based on the software update information, wherein the downloading is performed by the vehicle in a second state where power generation in the vehicle, or power supply to the vehicle, or both the power generation in the vehicle and the power supply to the vehicle is performed.

10. The non-transitory computer-readable storage medium according to claim 9, the instructions further cause the vehicle to:
- determine that a power consumption of a battery mounted on the vehicle, when power is supplied from the battery to download the software update program, is less than a first threshold; and
- download the software update program based on the software update information in the first state in response to the determination the power consumption is less than the first threshold.

11. The non-transitory computer-readable storage medium according to claim 10, wherein the first threshold is determined based on a remaining charge amount of the battery and a predetermined minimum remaining charge amount required by the battery.

12. The non-transitory computer-readable storage medium according to claim 9, the instructions further cause the vehicle to:
- estimate a remaining charge amount of a battery mounted on the vehicle;
- estimate a surplus power amount that the battery is enabled to output based on the remaining charge amount of the battery and a predetermined minimum remaining charge amount required by the battery;
- calculate an operable time used to download the software update program based on the surplus power amount and a power consumption used to download the software update program;
- notify the server of the operable time;
- receive a download start notification notified by the server based on a determination that the software update program is enabled to be downloaded within the operable time; and
- download the software update program based on the software update information in the first state in response to reception of the download start notification.

\* \* \* \* \*